(12) United States Patent
Mośko et al.

(10) Patent No.: US 8,162,014 B2
(45) Date of Patent: Apr. 24, 2012

(54) MOTOR-VEHICLE TYRE PROVIDED WITH A TREAD PATTERN WEAR INDICATOR

(75) Inventors: Martin Mośko, Belušà (SK); Ján Kotlas, Púchov (SK)

(73) Assignee: Continental Matador Rubber, s.r.o., Puchov (SK)

( * ) Notice: Subject to any disclaimer, the term of this patent is extended or adjusted under 35 U.S.C. 154(b) by 898 days.

(21) Appl. No.: 12/223,479

(22) PCT Filed: Feb. 27, 2007

(86) PCT No.: PCT/SK2007/050008
§ 371 (c)(1),
(2), (4) Date: Jul. 31, 2008

(87) PCT Pub. No.: WO2007/102790
PCT Pub. Date: Sep. 13, 2007

(65) Prior Publication Data
US 2009/0008009 A1 Jan. 8, 2009

(30) Foreign Application Priority Data
Mar. 8, 2006 (SK) .................................. 0047-2006

(51) Int. Cl.
*B60C 11/12* (2006.01)
*B60C 11/24* (2006.01)
(52) U.S. Cl. ............ 152/154.2; 152/209.17; 152/DIG. 3
(58) Field of Classification Search .............. 152/154.2, 152/209.17, DIG. 3
See application file for complete search history.

(56) References Cited

U.S. PATENT DOCUMENTS

| 4,154,564 | A * | 5/1979 | French ........................ 425/28.1 |
| 6,523,586 | B1 * | 2/2003 | Eromaki et al. ........... 152/154.2 |
| 6,883,567 | B2 * | 4/2005 | Shimura ..................... 152/154.2 |
| 2004/0074120 | A1 * | 4/2004 | Fryer et al. ...................... 40/450 |
| 2006/0037683 | A1 * | 2/2006 | Cuny et al. ................. 152/154.2 |
| 2006/0213594 | A1 * | 9/2006 | Kemp et al. ................ 152/154.2 |

FOREIGN PATENT DOCUMENTS
EP 250113 A2 * 12/1987
(Continued)

*Primary Examiner* — Steven D Maki
(74) *Attorney, Agent, or Firm* — Ohlandt, Greeley, Ruggiero & Perle, LLP; George W. Rauchfuss, Jr.

(57) ABSTRACT

Tire for motor-vehicles provided with a tread pattern wear indicator, where the tire tread is formed by pattern parts in the form of circumferential ribs and/or in the form of blocks and contains at least one circumferential groove, wherein the indicator is arranged in the surface part of the pattern in the circumferential ribs or blocks, which are in contact with the road surface, and is in the form of sipes running radially into tire tread, while the greatest depth of the indicator sipes is smaller than the depth (H) of the circumferential groove. The tread pattern wear indicator (3) consists of seven radial sipes of three different depths, created and arranged so that they form the Arabic numeral 8 in segment depiction. One of the above radial sipes has the smallest depth and in a horizontal section by a plane running through the bottom of the sipe in parallel with the tread surface the other 6 sipes are arranged into the Arabic numeral 6 in segment depiction, which is visible at a certain degree of tire wear, and three further sipes having the greatest depth of the above seven are arranged into part of the Arabic numeral 4, which is formed in the bottom plane of the three remaining sipes having the middle depth.

10 Claims, 4 Drawing Sheets

FOREIGN PATENT DOCUMENTS

| | | | |
|---|---|---|---|
| EP | 1066991 A2 | * | 1/2001 |
| EP | 1630008 A1 | * | 3/2006 |
| FR | 2011799 A | * | 5/1979 |
| GB | 2376002 A | * | 12/2002 |
| WO | WO-2004/045872 A1 | * | 6/2004 |

* cited by examiner

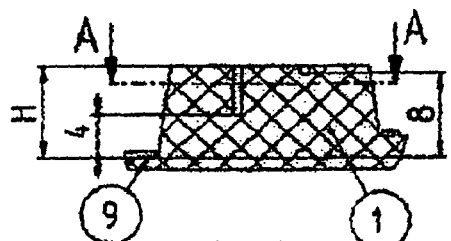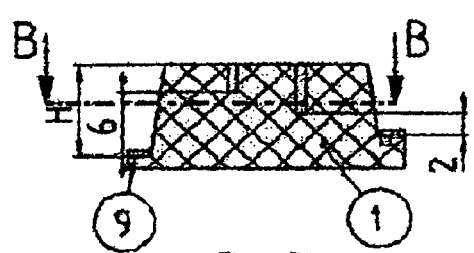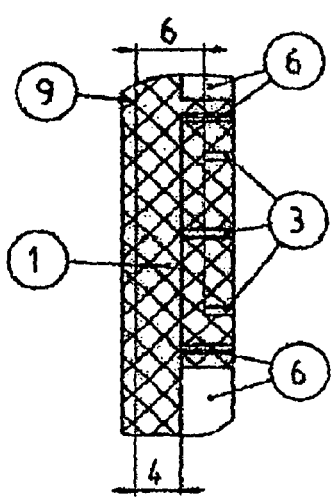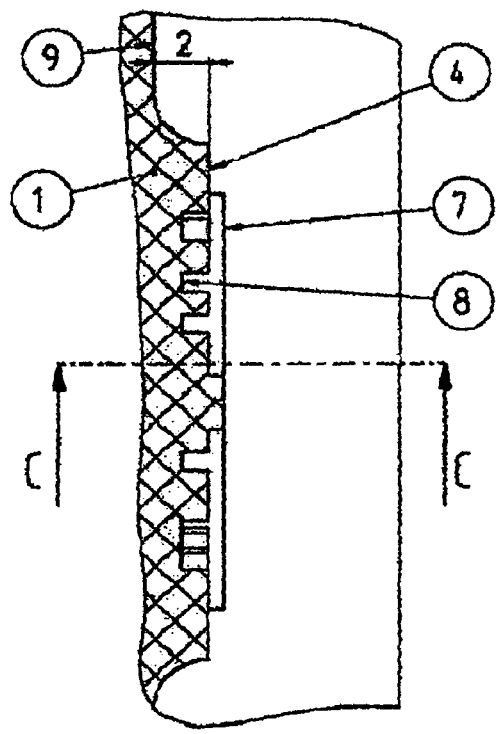

A-A

B-B

C-C
5:1

D-D

US 8,162,014 B2

MOTOR-VEHICLE TYRE PROVIDED WITH A TREAD PATTERN WEAR INDICATOR

This application is a US National Phase Application under 35 U.S.C. §371 from PCT Application No. PCT/SK2007/050008, filed 27 Feb. 2007, claiming priority from Slovak Patent Application No. PP 0047-2006 filed Mar. 8, 2006.

TECHNICAL FIELD

The invention concerns a tread wear indicator of a vehicle tyre, which indicator is embedded in the tyre, wherein the degree of tyre wear can be estimated by taking a glance at the tyre tread.

BACKGROUND ART

It is known from the practice that monitoring of the groove depth in the tyre tread is important for the safety of driving. Nevertheless, the driver needs not know the exact value of the groove depth, it is sufficient, if he/she is acquainted with the tyre tread wear in certain stages, which for a private car tyres are preferably in the range from 2 mm to 8 mm in steps of 2 mm, i.e. the groove depth should be indicated in steps of 8 mm, 6 mm, 4 mm. It is important that the information should be easily readable, it should be unambiguously expressed, and it should catch eye at a glance on the tyre tread.

From GB 2376002, there is known a tyre having an indicator embedded in the tread part under the surface. The indicator consists of rubber and is brightly coloured to contrast with the tread, to enable visual warning appearing at the surface when the tread is worn off. The indicator is located on the whole tyre circumference and may take the form of a band or several bands or pins passing through the tread depth. The indicator should be located at the minimum allowed depth of the tyre tread pattern or slightly over this allowed tread pattern depth.

WO2004/045872 utilizes the same principle of tyre wear indicator as described in GB 2376002.

U.S. Pat. No. 6,883,567 provides a method of measuring tyre tread wear by using a tyre, in which a marked part of the tread surface is created. The marked part changes its surface shape in dependence on the wear progress. The image data are scanned and processed and based on reference data entered in advance and the corresponding measured data on the tread surface wear, suitability for further using the tyre is determined.

EP 0250113 describes detection of early non-uniform tyre tread wear which is caused by wheel imbalance. The tyre tread is provided with groups of sipes of various depths so that with continuing wear also the number of sipes varies. The group of sipes preferably consists of at least five sipes on the outer ribs adjacent to the shoulder part of the tyre at the same circumferential position. The sipes are preferably formed with various lengths corresponding to their depth for the purpose of simpler identification. By observing how quickly the sipes of one group on the shoulder rib disappear by wear compared with the sipes on the second shoulder rib, non-uniform wear can be detected in early stage.

EP 1 066 991 describes a tyre, the wear of which can be observed by means of indicators arranged upwardly one after another, where each indicator is formed by a separate sipe running into the tyre in the tread direction. The sipe cross-section represents a number, which is at least 5.5 mm high and 3.5 mm wide.

The main disadvantage of this solution is the fact that individual indicator sipes are small, poorly visible from a greater distance, and they must be separated one from the other by sufficiently large spaces, which are at least as large as is the indicator height because of the necessity of good introduction of rubber in the mould at pressing, i.e. at displaying the groove depth steps of 8, 6, 4, the overall height of the indicator is at least 27.5 mm, which makes impossible to use the indicator in tread blocks which are narrower than 30 mm. Moreover, at the places where the indicator is used it is necessary to omit several transverse capillary sipes which are used mainly in winter tyres to improve their grip properties.

The tread groove depth is indicated by successive disappearing of indicators from the greatest number to the smallest one, while the remaining steps are always displayed. If one is not sufficiently informed about the indication method, this may possibly lead to inaccurate interpretation of the remaining groove depth. The sipe thickness is not sufficient, and when viewing it from a greater distance and with a soiled tread the indicator may be poorly visible. Because of complicated shape of the indicators, from the point of view of the production it is not possible to use thicker metal sheet of the forming lamella than 0.4 mm.

A disadvantage of the above solution is that each indicator number is formed by a separate lamella, each of them having a shape which is complicated to produce. Also disadvantageous is the fact that the groove depth is expressed by the greatest visible number, while the remaining depths are also visible, thus causing ambiguous depth expression, the numbers are small (height of 5.5 mm, width of 3.5 mm) and, thus, they are visible only at detailed tyre inspection. The indicator, which expresses the depths 8, 6, 4, is at least 27.5 mm high, the width is 3.5 mm, the thickness is less than 0.5 mm. A disadvantage is also the overall indicator height of at least 27.5 mm (structurally it cannot be lower), and therefore, the indicator cannot be used in treads which do not contain a circumferential band in the middle of the tyre tread or where the bands and blocks are narrower than 30 mm in the tangential direction.

The aim of the present invention is to produce a tyre, which is provided with a safety indicator indicating the groove depth, based on which one can simply estimate the remaining groove depth and thus the wear state of the tyre.

The basic aim has been to achieve an indicator which is better visible than described above, of which one can comfortably deduct the wear value at a routine tread check and where a warning possibility exists also at an incidental glance at the tread.

DISCLOSURE OF INVENTION

The above given disadvantages are solved to a great extent by a motor-vehicle tyre provided with a tread pattern wear indicator according to the present invention, wherein the tyre tread is formed by tread parts in the form of circumferential ribs and/or in the form of blocks and it contains at least one circumferential groove. The indicator is arranged in the surface part of the tread, in the circumferential ribs or blocks, which are in contact with the road, and which is in the form of sipes, running radially into the tyre tread, while the greatest depth of the sipes of the indicator is smaller than the depth (H) of the circumferential groove. The nature of the tyre with safety indicator according to the present invention is that the indicator is formed of 7 sipes of three different depths formed and arranged so that they form an Arabic numeral 8 in segment depiction, where one of the above sipes has the smallest depth, and in a horizontal section in a plane running through the bottom of the sipe in parallel with the tread surface the other 6 sipes are arranged into the Arabic numeral 6 in segment depiction, which is visible at a certain degree of tyre wear, three further sipes of the above seven having the greatest depth are arranged such that a middle sipe of the three further sipes is oriented substantially perpendicular to the other two sipes of the three sipes so that only part of the Arabic numeral 4, is formed in the bottom plane of the three remaining sipes having the middle depth.

According to a preferred embodiment, the indicator may be enhanced with arrows pointing at the indicator, where the arrows are formed by sipes running into the tyre in radial direction to a depth which is preferably the depth of the deepest sipe of the indicator.

A tyre according to a further embodiment may contain an indicator which, for the purpose of better warning that the service life of the tyre is over, is enhanced with 2 mm high projection in the adjacent circumferential groove, located near the indicator, into which projection an inscription "STOP" is embedded, double crossed with a protrusion which negates the inscription "STOP" when the groove depth (H) is satisfactory.

According to a further embodiment, a tyre according to the present invention contains an indicator which may be enhanced with one or more inscriptions "SAFETY INFO" or other inscription, having similar or identical meaning in any language, protruding in the radial direction from the bottom of adjacent circumferential grooves.

A preferred size for the indicator to be well visible also at an incidental glance at the tyre includes the minimum length of 12 mm and minimum width of 5.2 mm.

The width of the sipes forming the indicator may be 0.5 to 1 mm, preferably 0.6 mm.

It is preferable, if the protrusion in the form of double crossing over the inscription "STOP" is at least 1 mm high. According to a preferred embodiment a tyre according to the present invention contains an indicator, the 3 deepest sipes of which are formed with such depth that their bottoms are situated in a plane which is 4 mm apart from the bottom of the circumferential groove, and 3 middle depth sipes of the indicator are formed with such depth that their bottoms are situated in a plane which is 6 mm apart from the bottom of the circumferential groove.

This is achieved by a tyre provided with an indicator in the surface part of the tread, in circumferential bands or blocks, which are in contact with the road surface, and which is in the form of sipes, running radially into the tyre. The cross-section through the indicator in the tread direction represents according to the remaining groove depth Arabic numerals 8, 6, partial 4 in the tread direction perpendicular to the bottom of the above indicator. The indicator may be enhanced with arrows pointing at the indicator, where the arrows are formed by radial sipes running into the tyre to a depth which is preferably the depth of the deepest sipe of the indicator. Moreover, the indicator may include an inscription "STOP" for the purpose of better warning that the service life of the tyre is over. This inscription is embedded in a 2 mm high projection in a groove, which is located near the indicator. This inscription is doubly crossed by a protrusion which negates the inscription "STOP" when the groove depth (H) is sufficient. The indicator may be enhanced with one or more inscriptions "SAFETY INFO" in radial direction protruding from the bottom of adjacent grooves.

It is known that numerals are displayed by means of segments like, for example, segment displays of electronic devices (calculators, digital watches etc.).

An advantage consists in that the sipes have a simple shape and can be easily produced.

The numerals 6 and 4 arise by sequential disappearing (tyre wear) of the corresponding sipes in the indicator. The indicator height expressing the groove depths 8, 6, 4 mm is at least 12 mm, and the width is 5.2 mm. This results in a possibility to use the indicator also in blocks which are narrower than 20 mm and to minimize omitting of transverse capillary grooves, especially for winter tyres. With the indicator according to the present invention, the remaining groove depth is always unambiguously expressed by a single numeral. The thickness of sipes is 0.6 mm, which sufficiently enhances visibility of the indicator.

AN OVERVIEW OF FIGURES IN THE DRAWINGS

FIG. 3a shows horizontal section through FIG. 2 along the line 1-1.

FIG. 3b shows horizontal section through FIG. 2 along the line 2-2.

FIG. 3c shows vertical section through FIG. 2 along the line 3-3.

FIG. 3d shows vertical section through FIG. 2 along the line 4-4.

EXAMPLES OF INVENTION EMBODIMENTS

Figure 1:
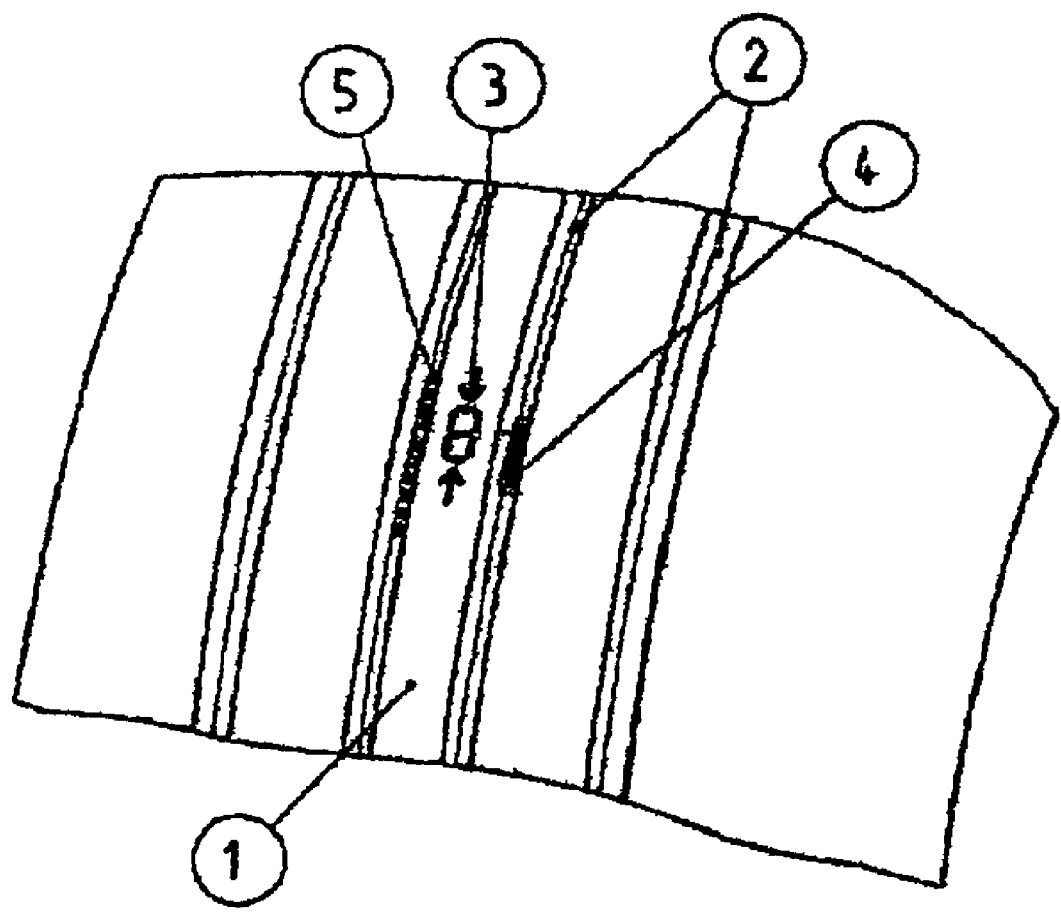
FIG. 1 shows an outline of a part of summer tyre tread with circumferential grooves (2), provided with a safety indicator according to the invention.

FIG. 1 shows an outline of a part of the tread of a summer tyre (1) with circumferential grooves (2), provided with a safety indicator (3), supplemented with a projection (4) in the circumferential groove (2) with warning when the service life of the tyre is over (inscription "STOP") and an inscription (5) "SAFETY INFO" in a different adjacent circumferential groove (2).

Figure 2:
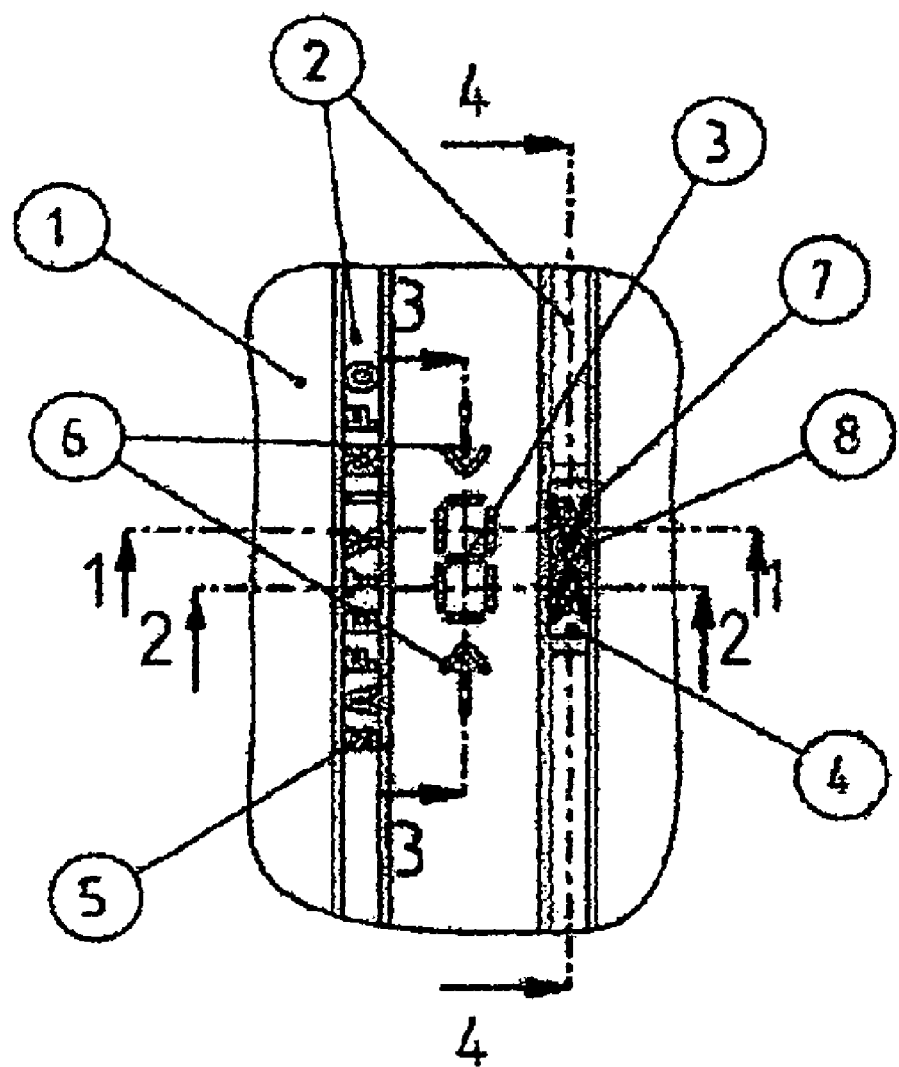
FIG. 2 shows a top view of a tyre of FIG. 1 in radial direction.

FIG. 2 shows a detail of FIG. 1, namely a top view of a part of the tread of tyre (1) in radial direction. Indicator (3) is arranged on the central rib, where one can easily see seven sipes arranged into a segment depicted numeral 8, wherein two sipe pairs are formed in the circumferential direction and a triple of parallel sipes in the transverse direction. Although the above 7 sipes may be of the same length, they have different depths in the radial direction as described below. In the circumferential direction, the indicator is enhanced with sipes in the form of arrows (6), the depth of which may be the same as that of the deepest sipe of indicator (3). One groove (2) adjacent to the rib, on which indicator (3) is located, is in this case provided with a projection (4), into which is embedded the inscription (8) "STOP", double crossed with the protrusion (7). Double crossing of the inscription (8) "STOP" negates the inscription (8) "STOP", if the tread depth is satisfactory. The inscription "STOP" will appear when the protrusion (7) is worn, which protrusion extends to the tread height corresponding to the depth of the deepest sipe in the indicator (3), as can be seen in FIG. 3d, which shows the section through FIG. 2 along the line 4-4. The second groove (2) adjacent to the circumferential rib of the tyre, on which the indicator (3) is located, contains protrusions (5) in the form of the inscription "SAFETY INFO".

Figure 4A:
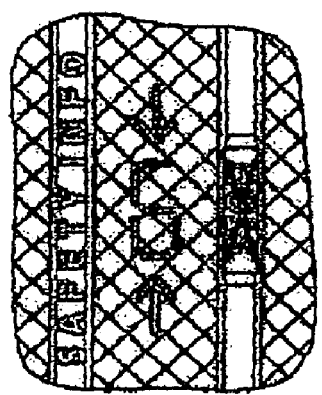
FIG. 4a shows horizontal section through FIG. 3a along the line A-A.

FIG. 3a shows horizontal section through FIG. 2 along the line 1-1, running through the upper pair of parallel sipes forming indicator (3), and one can see that the depth of the right sipe of the indicator is smaller than that of the left sipe of the indicator. The left sipe is the deepest sipe, the bottom of which is situated in a plane parallel with the tread surface at a distance of 4 mm from bottom (9) of the circumferential groove, while the right sipe is the shallowest sipe of the indicator and the sipe bottom is situated in a plane parallel with the tread surface at a distance of 8 mm from bottom (9) of the circumferential groove (2). By continuing tyre wear this sipe disappears from the tread surface as the first one. By vanishing of this sipe from the tread surface, there remains Arabic numeral 6 formed by the remaining 6 sipes in segment depiction, as shown in FIG. 4a, which is the horizontal section of FIG. 3a along the line A-A. FIG. 4a shows a part of the tread surface of tyre (1), for which the depth of the circumferential groove (2) after wear is 6 mm and more. Thus, the bottom (9) of the circumferential groove (2) is in the depth of at least 6 mm from the tread surface.

FIG. 3b shows the horizontal section through FIG. 2 along the line 2-2, running through the lower pair of parallel sipes forming the indicator, and one can see that the depth of the right sipe is greater than that of the left sipe. If we compare it with the preceding FIG. 3a, it is clear that the left sipe in FIG. 3b is deeper than the right sipe in FIG. 3a. The right sipe in FIG. 3b has the same depth as the left sipe in FIG. 3a. These two sipes represent two of the three sipes having the greatest depth. The bottom of these three deepest sipes is situated in a plane parallel to the tread surface and located 4 mm from the bottom (9) of the circumferential groove (2).

FIG. 3c shows the vertical section through FIG. 2 along the line 3-3, and one can see one central sipe with the greatest depth and two having smaller depth corresponding to that of the left groove in FIG. 3b. With further wear of the tyre tread the left sipe of FIG. 3b disappears so as do the other two sipes having the same depth which are a part of the indicator and are shown in FIG. 3c, while the remaining three sipes having the greatest depth will form part of the Arabic numeral 4 in segment depiction as presented in FIG. 4b.

FIG. 3c shows also two further sipes which are a part of the arrows (6) and have the same depth as the deepest indicator sipe.

FIG. 3d shows the vertical section through FIG. 2 along the line 4-4 and one can see in it the radial projection (4) in groove (2), protruding 2 mm high from the bottom (9) of the circumferential groove (2), the embedded inscription (8) "STOP", representing the information that the service life of the tyre is over. In the case of satisfactory tread depth one can see also the double crossing by the protrusion (7) negating the embedded inscription (8) "STOP".

Figure 4B:
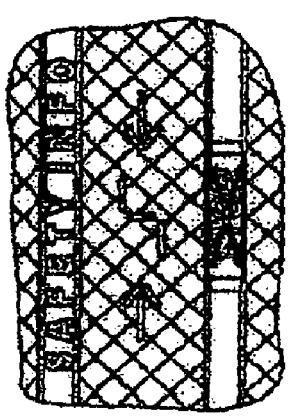
FIG. 4b shows horizontal section through FIG. 3b along the line B-B.

FIG. 4b shows the horizontal section through FIG. 3b along the line B-B and shows a part of the tread of tyre (1) for which the depth of the circumferential groove (2) after wear is 4 mm and less.

Figure 4C:
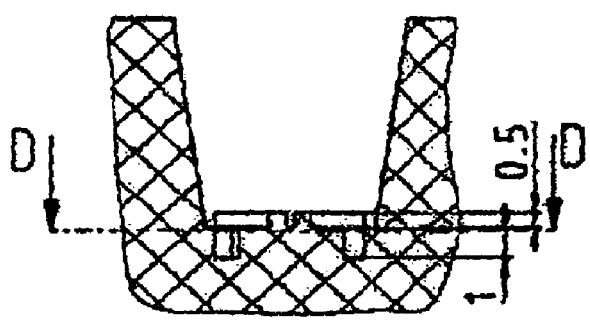
FIG. 4c shows horizontal section through FIG. 3d along the line C-C.

FIG. 4c shows the horizontal section through FIG. 3d along the line C-C. One can see in the section the radial embedding of the inscription (8) "STOP" into the projection (4) in circumferential groove (2), preferably at the depth of 1 mm, and the double crossing formed by radial protrusion (7), wherein the height of the protrusion is preferably 0.5 mm.

Figure 4D:
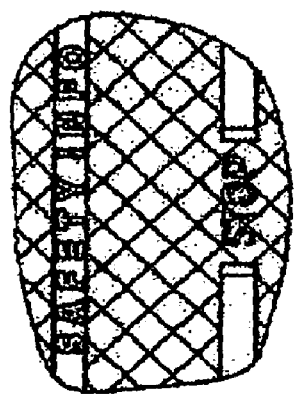
FIG. 4d shows horizontal section through FIG. 4c along the line D-D.

FIG. 4d shows the horizontal section through FIG. 4c along the line D-D and shows a part of the surface of worn tyre (1) for which the depth of the circumferential groove (2) is 2 mm and less, thus a completely worn tyre which no more meets the service conditions.

In an embodiment of this invention indicator (3) has a minimum length of 12 mm and a minimum width of 5.2 mm. In an embodiment of this invention the sipes forming the indicator (3) have a width of 0.5 to 1 mm, preferably 0.6 mm. In an embodiment of this invention the protrusion (7) that forms a double crossing is at least 1 mm high. Also in an embodiment of this invention the 3 deepest sipes of indicator (3) are formed with the depth extending to a distance of 4 mm from the bottom (9) of the circumferential groove (2). Additionally, in an embodiment of this invention the 3 middle deep sipes of indicator (3) are formed with the depth such that their bottom lines in a plane which is 6 mm apart from the bottom (9) of the circumferential groove (2).

The invention claimed is:

1. Tyre for motor-vehicles provided with a tread pattern wear indicator, where a tread of the tyre is formed by pattern parts in the form of circumferential ribs or in the form of blocks and contains at least one circumferential groove having a bottom surface of a depth (H), the indicator being arranged in a surface part of a circumferential rib or block, which can come into contact with a road surface, and the indicator comprises sipes running radially into the tyre tread, wherein the indicator sipes have a greatest depth that is smaller than the depth (H) of the circumferential groove, characterized in that the indicator (3) is formed of seven radial sipes of three different depths, created and arranged so that they form the Arabic numeral 8 in segment depiction at the surface of the tread, where one of the above radial sipes has a smallest depth, and in a horizontal section by a plane running through a bottom of the sipe having the smallest depth in parallel with the tread surface the other 6 sipes are arranged into the Arabic numeral 6 in segment depiction, which is visible at a certain degree of tyre wear, and three further sipes of the above seven having the greatest depth are arranged such that a middle sipe of the three further-sipes is oriented substantially perpendicular to the other two sipes of the three sipes so that only part of the Arabic numeral 4 is formed, which is formed in a bottom plane of the three remaining sipes having a middle depth.

2. Tyre according to claim 1, characterized in that the indicator is supplemented with arrows (6) pointing at the indicator (3), where the arrows are formed by the sipes which run into the tyre (1) in radial direction to a depth which is the depth of the deepest sipe of the indicator (3).

3. Tyre according to claim 1, characterized in that the indicator is, for the purpose of better warning that service life of the tyre is over, enhanced with 2 mm high projection (4) in an adjacent circumferential groove (2), located near the indicator (3), into which projection an inscription "STOP" (8) is embedded, double crossed with a protrusion (7) which negates the inscription "STOP" when the depth (H) of the circumferential groove (2) is satisfactory.

4. Tyre according to claim 3, characterized in that protrusion (7) is in the form of a double crossing that is at least 1 mm high.

5. Tyre according to claim 1, characterized in that the indicator (3) is provided with one or more inscriptions (5) "SAFETY INFO" or other inscription, having similar or identical meaning in any language, protruding in the radial direction from the bottom of adjacent circumferential grooves (2).

6. Tyre according to claim 1, characterized in that the indicator (3) has a minimum length of 12 mm and minimum width of 5.2 mm.

7. Tyre according to claim 1, characterized in that the sipes forming indicator (3) have a width of 0.5 to 1 mm.

8. Tyre according to claim 7, characterized in that the sipes forming indicator (3) have a width of 0.6 mm.

9. Tyre according to claim 1, characterized in that the 3 sipes of indicator (3) having the greatest depth are formed with a depth extending to a distance of 4 mm from the bottom (9) of the circumferential groove (2).

10. Tyre according to claim 1, characterized in that the 3 sipes of indicator (3) extending to the middle depth are formed with a depth such that their bottom lies in a plane which is 6 mm apart from the bottom of the circumferential groove (2).

* * * * *